United States Patent [19]

Shimmyo

[11] Patent Number: 5,025,326
[45] Date of Patent: Jun. 18, 1991

[54] FACSIMILE MACHINE USING CUT SHEETS AS RECEIVED-SIGNAL RECORDING PAPER AND METHOD OF FEEDING THE CUT-SHEETS

[75] Inventor: Takashi Shimmyo, Musashino, Japan

[73] Assignee: Kabushiki Kaisha Toshiba, Kawasaki, Japan

[21] Appl. No.: 411,002

[22] Filed: Sep. 22, 1989

[30] Foreign Application Priority Data

Sep. 30, 1988 [JP] Japan ............................ 63-127102[U]

[51] Int. Cl.⁵ ............................................. H04M 1/04
[52] U.S. Cl. .................................... 358/498; 358/401; 358/476
[58] Field of Search ............... 358/498, 476, 401, 321, 358/322; 379/100

[56] References Cited

U.S. PATENT DOCUMENTS

| | | | |
|---|---|---|---|
| 4,005,257 | 1/1977 | Krallinger et al. | 358/498 |
| 4,414,579 | 11/1983 | Dattilo | 358/498 |
| 4,750,046 | 6/1988 | Chu | 358/498 |
| 4,914,525 | 4/1990 | Abe et al. | 358/498 |

FOREIGN PATENT DOCUMENTS

| | | | |
|---|---|---|---|
| 5891258 | 2/1980 | Japan | 358/498 |
| 58-107771 | 6/1983 | Japan | 358/498 |

Primary Examiner—Edward L. Coles, Sr.
Attorney, Agent, or Firm—Finnegan, Henderson, Farabow, Garrett and Dunner

[57] ABSTRACT

A facsimile machine which uses cut sheets as received-signal recording paper. In the facsimile machine, a recording paper cassette for containing the cut sheets is removably mounted at one side of a machine casing as the main frame of the facsimile machine. Provided on the upper side of the machine casing are a recorded-sheet stocking zone in which the cut sheets having received-images already recorded are stocked thereon as well as an original sheet placement zone in which original sheets are placed, so that the both zones are at mutually different levels. The original sheet introduced from the original placement zone into the interior of the machine casing is discharged onto the recording paper cassette, while the cut sheet from the recording paper cassette into the interior of the casing is discharged into the recorded-sheet stocking zone provided above the casing. Thus the whole installation space of such a type of facsimile machine as using cut sheets as received-signal recording paper can be reduced to a large extent.

10 Claims, 5 Drawing Sheets

FACSIMILE MACHINE USING CUT SHEETS AS RECEIVED-SIGNAL RECORDING PAPER AND METHOD OF FEEDING THE CUT-SHEETS

BACKGROUND OF THE INVENTION

1. Field of the Invention

The present invention relates generally to facsimile machines and methods of feeding the cut sheets and, more particularly, to a facsimile machine which can effectively make a good use of a machine casing as the main frame of the machine as well as the installation zone of a recording-paper cassette removably attached onto one side of the machine casing as a cut-sheet stocking medium to realize the feeding and discharging of sheets (including original documents and received-signal recording cut sheets), thereby realizing the reduction of the whole installation space occupied by the facsimile machine, and also to a method of feeding the sheets.

2. Description of the Prior Art

Most prior art facsimile machines have so far used a rolled sheet (usually referred to as "rolled paper") as received-signal recording paper. Such a rolled paper, after cut into a predetermined length, tends to be subjected to a curling and thus it is highly difficult to file the cut sheet properly (poor filing property). Under such circumstances, there have been recently increased the number of such facsimile machines that employ the thermal transfer system or the electrophotographic system as a received-signal recording system and that use ordinary paper, i.e., cut sheets having an excellent filing property as received-signal recording paper.

FIG. 1 conceptionally shows a widely known structure of this type of facsimile machine using cut sheets as received-signal recording paper.

In such a facsimile machine as shown in FIG. 1, a machine casing 1 as the main frame of the facsimile machine is integrally provided at its upper side with an original-document base 2 which carries original document sheets OS thereon. Also removably mounted at one side of the machine casing 1 is a recording paper cassette 3 which contains cut sheets CS as the received-signal recording paper. Further mounted at the other side of the machine casing 1 are an original-document stacker 4 which receives and stacks the discharged (that is, read) original document sheets OS as well as a recording-paper stacker 5 which receives and stacks the discharged cut sheets CS (that is, having the received image recorded thereon).

Within the interior of the machine casing 1, a reading means 6 is provided between the original document base 2 and the original document stacker 4 for reading an image written on the original document sheet OS and a recording means 7 is provided between the recording paper cassette 3 and the recording-paper stacker 5 for recording the read image on the cut sheet CS.

In the operation of the facsimile machine, the original document sheets OS placed on the original document base 2 are introduced sequentially into the interior of the machine casing 1 by a suitable feeding means, subjected by the reading means 6 to reading operations of images written on the sheets OS, and then fed, received and stacked into the original document stacker 4 by a second suitable feeding means. The cut sheets CS within the recording-paper cassette 3, on the other hand, are sequentially introduced into the interior of the machine casing 1 by a third suitable feeding means, subjected by the recording means 7 to recording operations of the read images on the sheets CS, and then fed, received and stacked into the recorded paper stacker 5 by a fourth suitable feeding means. The cut sheets CS thus stacked in the recording paper stacker 5, since the cut sheets are less subjected to curling or the like, have an excellent filing property, as has been explained earlier. In FIG. 1, a modem and so on to be usually incorporated in a facsimile machine are not illustrated for abbreviation of explanation.

Such a facsimile machine, which uses cut sheets as received-signal recording paper, requires the recording paper cassette 3 to be attached thereto. Even when the arrangement of the known facsimile machine using a rolled sheet as received-signal recording paper as mentioned earlier is employed without any change, it has been common practice to mount at the other side of the machine casing 1 opposed to the cassette 3 such original document and recorded paper stackers 4 and 5 for receiving and stacking sheets discharged from the machine casing 1 as shown in FIG. 1. For this reason, when such a facsimile machine is installed, this has required not only an installation zone B occupied by the recording paper cassette 3 but also an installation zone C occupied by the original-document and recorded-paper stackers 4 and 5, in addition to a casing installation zone A occupied by the machine main frame casing 1, resulting in that the facsimile machine occupies a large total installation space corresponding to the sum of the zones A, B and C.

SUMMARY OF THE INVENTION

Under such cicumstances, it is an object of the present invention to provide a facsimile machine which uses cut sheets as received-signal recording paper, and when a recording paper cassette for containing these cut sheets are mounted onto one side of a machine casing, which effectively makes a good use of both the installation zone of the machine casing and the installation zone of the recording paper cassette to realize the effective feeding and discharging of these sheets and therefore to realize the reduction of an entire installation space occupied by the facsimile machine, and also to provide a method of feeding the cut sheets.

In accordance with one aspect of the present invention, the above object is attained by introducing an original document sheet into the interior of the machine casing from the outside of the casing in the casing installation zone, subjecting the introduced original document sheet to a reading operation of an image written on the original sheet to be transmitted within the machine casing, and then discharging the read original sheet into the recording-paper cassette installation zone out of the machine casing.

At least this can eliminate the need for the separate attachement of the original document stacker onto the other side of the machine casing opposed to the recording paper cassette.

In accordance with another aspect of the present invention, further, a recording cut sheet is introduced into the interior of the machine casing from the recording paper cassette, subjected to a recording operation of the read image thereon within the machine casing and then discharged into the casing installation zone out of the casing.

This can eliminate the need for the separate attachement of the recorded cut sheet (having the read image already recorded thereon) stacker onto the other side of the machine casing opposed to the recording paper cassette. As a result, the total installation space of the facsimile machine according to the present invention, which corresponds only to the sum of the casing installation zone and the recording-paper-cassette installation zone, can be reliably reduced when compared with that of the same type of prior art facsimile machine.

Specific examples of the method of feeding these sheets (oridignal document sheets and cut sheets) include (a) to (d) in the following.

(a) Discharging of the original document sheet having the image read therefrom is carried out on an upper cover of the recording paper cassette, discharging of the cut sheet having the received picture image recorded thereon is carried out on the machine casing, and the original document sheets are sequentially introduced into the interior of the machine casing from an original document base provided at a level different from a cut-sheet discharge zone into which the cut sheet having the received image recorded thereon is discharged.

(b) Discharging of the original document sheet having the image read therefrom is carried out into a stacker provided above the recording paper cassette, discharging of the cut sheet having the received picture image recorded thereon is carried out on the machine casing, and the original document sheets are sequentially introduced into the interior of the machine casing from an original document base provided at a level different from a cut-sheet discharge zone into which the cut sheet having the received image recorded thereon is discharged.

(c) Discharging of the original document sheet having the image read therefrom is carried out on an upper cover of the recording paper cassette, discharging of the cut sheet having the received picture image recorded thereon is carried out into a stacker provided above the machine casing, and the original document sheets are sequentially introduced into the interior of the machine casing from an original placement zone provided at a level different from the stacker.

(d) Discharging of the original document sheet having the image read therefrom is carried out into a first stacker provided above the recording paper cassette, discharging of the cut sheet having the received picture image recorded thereon is carried out into a second stacker provided above the machine casing, and the original document sheets are sequentially introduced into the interior of the machine casing from an original document placement zone provided at a level different from the second stacker.

In particular, when the above example (a) is employed, this is advantageous from the viewpoint of its manufacturing cost because the need for the separate provision of the original sheet stacker and the cut sheet stacker can be eliminated.

DESCRIPTION OF THE PREFERRED EMBODIMENT

Figure 1:
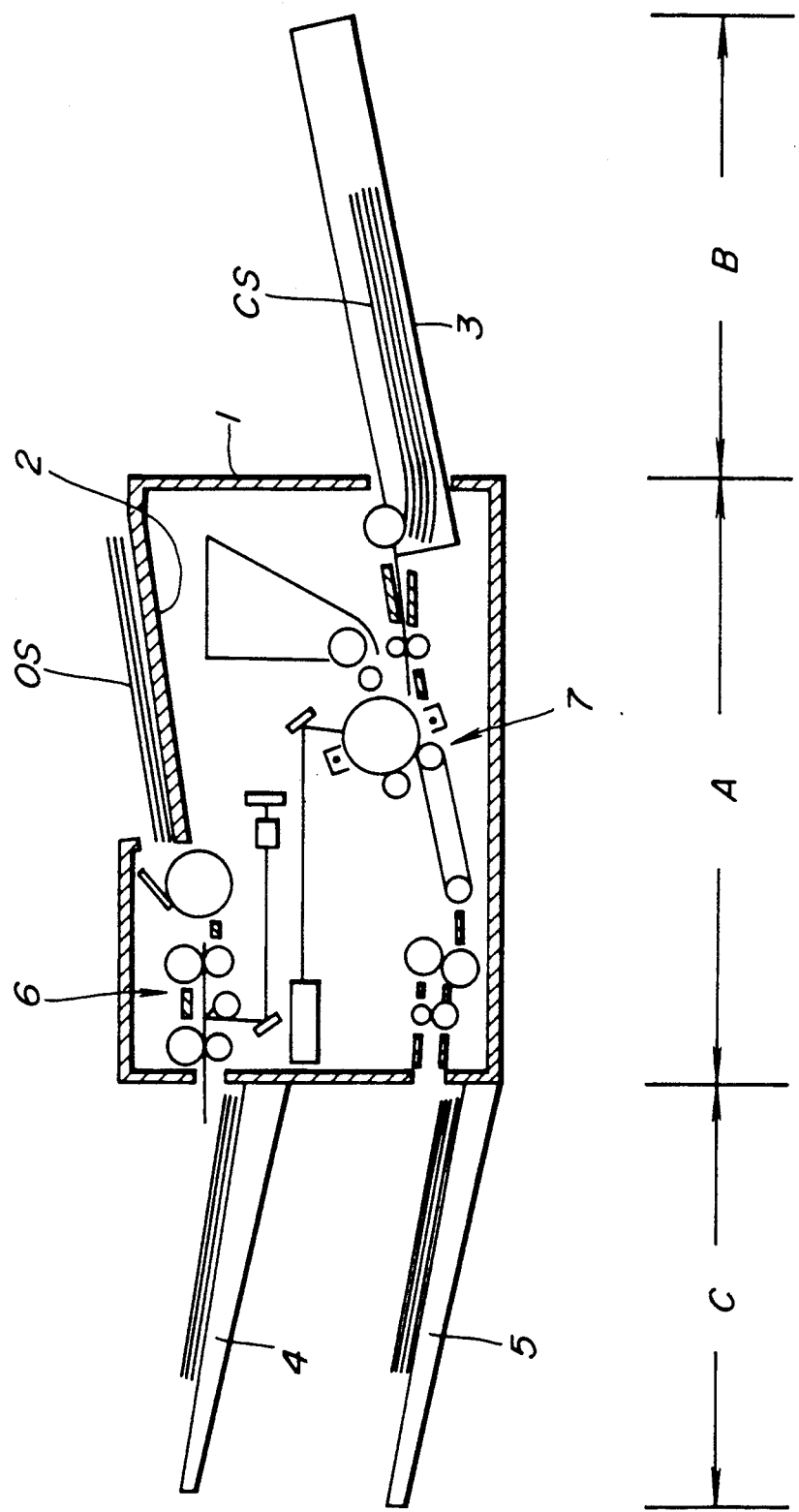
FIG. 1 is a cross-sectional view conceptionally showing a widely known structure of a facsimile machine of a type using cut sheets as received-signal recording paper.
Figure 2:
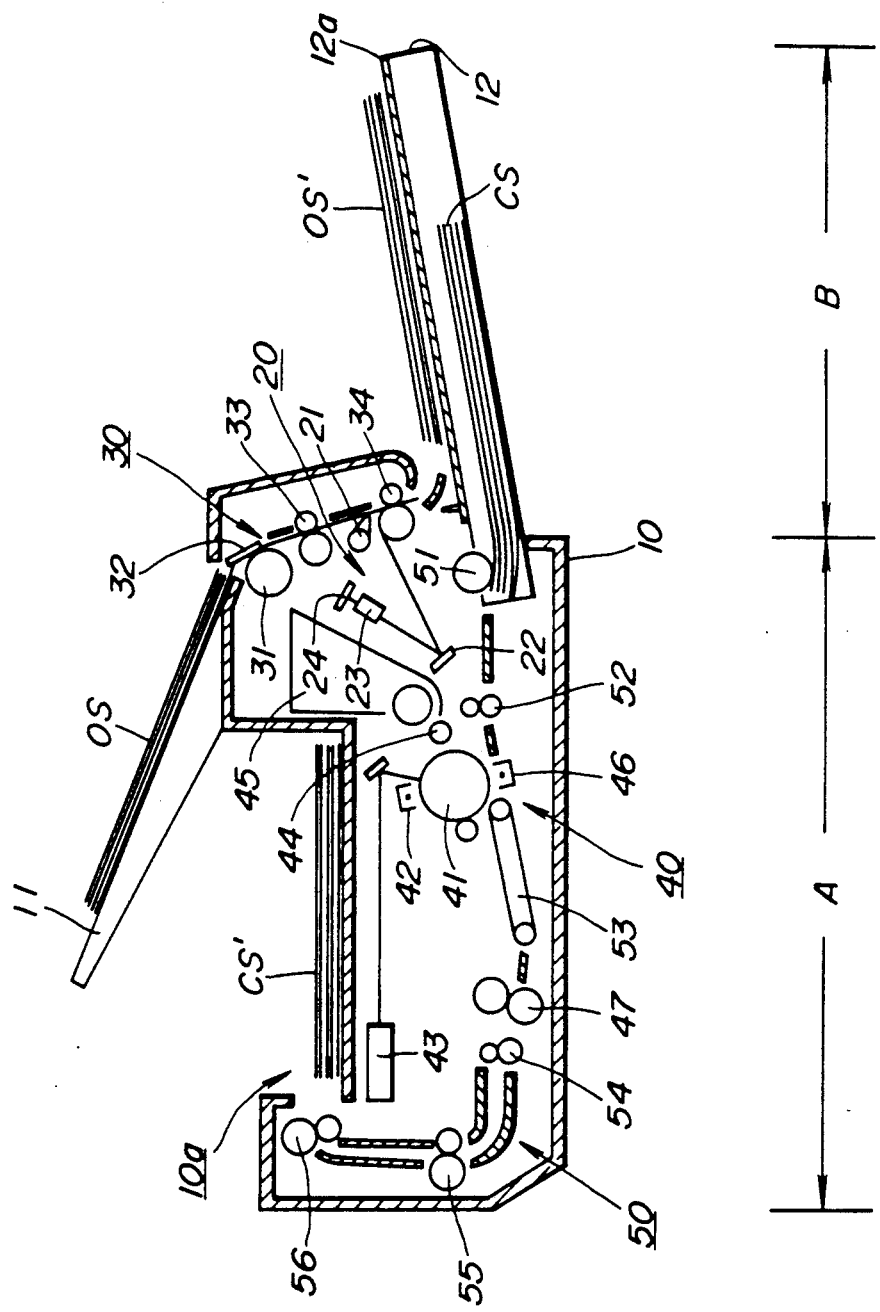
FIG. 2 is a cross-sectional view showing a facsimile machine and a method of feeding sheets in accordance with a first embodiment of the present invention.

FIG. 2 conceptionally shows the structure of a facsimile machine in accordance with a first embodiment of the present invention, which machine is supposed to be of such a type that uses cut sheets as received-signal recording paper as mentioned earlier. Even in FIG. 2, a modems and so on to be naturally provided as known units in the facsimile machine are not illustrated for abbreviation of explanation as in FIG. 1.

The facsimile machine of the first embodiment, as shown in FIG. 2, includes a machine casing 10 which has a recessed zone 10a provided on the upper side of the casing to receive and stack a recorded sheet, i.e., a cut sheet CS' having the read picture image recorded thereon and which also has an original document base 11 provided at a level vertically higher than the recessed zone 10a to place and stack original document sheets OS thereon.

More in detail, the original sheet base 11 is extended obliquly upwardly from that portion of the upper side of the casing 10 adjacent to the recessed zone 10a in such a manner that the recorded-sheet (cut-sheet CS') stacking zone of the recessed zone 10a on the upper side of the machine casing 10 and an original sheet (OS) base zone are located in an identical machine-casing (10) installation zone at different levels to define a predetermined space.

Removably attached onto one side of the machine casing 10 is a recording-paper cassette 12 for containing cut sheets CS. The cassette 12 is shaped in the form of a rectangular box having an open upper side which opening is closed by a cover 12a. The upper surface of the cover 12a is used as a zone on which already-read original document sheets OS' are stacked. That is, a cut-sheet (CS) containment zone and a read-original-sheet (OS') stacking zone are both present at different levels in an identical recording-paper-cassette (12) installation zone.

Disposed between the original document base 11 and the cover 12a of the recording paper cassette 12 having the original sheet (OS') stacking zone thereon within the interior of the machine casing 10 of the facsimile machine are, as shown in FIG. 2, a reading means 20 for reading a picture image writen on the original sheet OS as well as an original feeding path 30 for feeding therealong the original document sheet OS from the original document base 11 through the reading means 20 to the cover 12a.

More in detail, the reading means 20 includes a light source 21 for irradiating light on one side of the fed original document sheet OS having a picture image (to be transmitted) written thereon, a mirror 22 for reflecting part of the irradiated light reflected at the image surface of the original document sheet, a lens 23 for condensing the reflected light at the mirror 22, and a sensor 24 for reading the image to be transmitted on the basis of the light information collected through the lens 23. The original document feeding path 30 includes a paper feeding roller 31 for sequentially introducing the original document sheets OS placed on the original document sheet base 11 one after one into the machine casing 10, a friction separating piece 32 provided as slidably contacted with the peripheral surface of the paper feeding roller 31 for separating the original document sheets OS to be introduced, a pair of feeding rollers 33 for the introduced original sheet OS to the reading means 20, and a pair of discharge rollers 34 for discharging the already-read original sheet OS' onto the cover 12a.

Also disposed between the recording paper cassette 12 and the recessed zone 10a within the machine casing 10 of the facsimile machine are, as shown in FIG. 2, a recording means 40 for recording the received image on the cut sheet CS as well as a cut-sheet feeding path 50 for feeding the cut sheet CS from the recording paper cassette 12 via the recording means 40 to the recessed zone 10a.

More in detail, the recording means 40 includes a photosensitive drum 41, a charger 42 for applying charges onto the photosensitive drum 41, a laser beam scanner 43 for exposing the charged photosensitive drum 41 with light beam according to the received image information, a developing unit 44 for developing a latent image formed through the light exposure on the photosentive drum 41, a developing-agent supplying chamber 45 for supplying developing agent to the developing unit 44, a transfer unit 46 for transferring the developed picture image onto the cut sheet CS to be fed, and a fixing device 47 for the picture image transferred on the cut sheet CS. The cut-sheet feeding path 50 includes a paper feeding roller 51 for sequentially introducing into the machine casing 10 one after one the cut sheets CS contained within the recording paper cassette 12, a pair of feeding rollers 52 for guiding the introduced cut sheet CS into the recording means 40, a conveyor belt 53 for guiding the cut sheet CS transferred with the image into the fixing device 47, and a set of discharge rollers 54, 55 and 56 for discharging the image-fixed cut sheet, i.e., the cut sheet CS' into the recessed zone 10a.

In the facsimile machine of the present invention, therefore, the original document sheets OS placed on the original document base 11 are sequentially introduced into the interior of the machine casing 10 (original sheet feeding path 30) one after one from bottom one of the stacked document sheets through cooperation between the paper feeding roller 31 and the friction separating piece 32, read with respect to picture images written thereon through the reading means 20, and then discharged onto the cover 12a of the recording paper cassette 12 through the pair of discharge rollers 34.

The cut sheets CS contained as stacked within the recording paper cassette 12, on the other hand, are sequentially introduced into the machine casing 10 (cut sheet feeding path 50) one after one from top one of the stacked cut sheets of the cassette 12 through the paper feeding roller 51, subjected by the recording means 40 to recording (transferring and fixing) operations of the received picture images, and then discharged into the recessed zone 10a on the upper surface of the machine casing 10 through the set of discharge rollers 54, 55 and 56.

In this way, in accordance with the first embodiment, the already-read original document sheets OS' are discharged onto the recording paper cassette 12 (more exactly, the cover 12a thereof) spatially overlapped with the cut-sheet (CS) cassette zone; whereas the cut sheets CS' having the received picture images already recorded thereon are discharged into the recessed zone 10a located on the upper surface of the machine casing 10 and spatially overlapped with the original sheet (OS) placement zone or in other words, into the casing installation zone A. As a result, the whole installation space of the facsimile machine of the present invention can be reduced by a space corresponding to the stacker installation zone C (refer to FIG. 1) when compared with that of the prior art facsimile machine of FIG. 1.

Further, the first embodiment requires no special stackers for holding the original document sheets OS' and the cut sheets CS' and thus advantageous from the viewpoint of its manufacturing costs.

Figure 3:
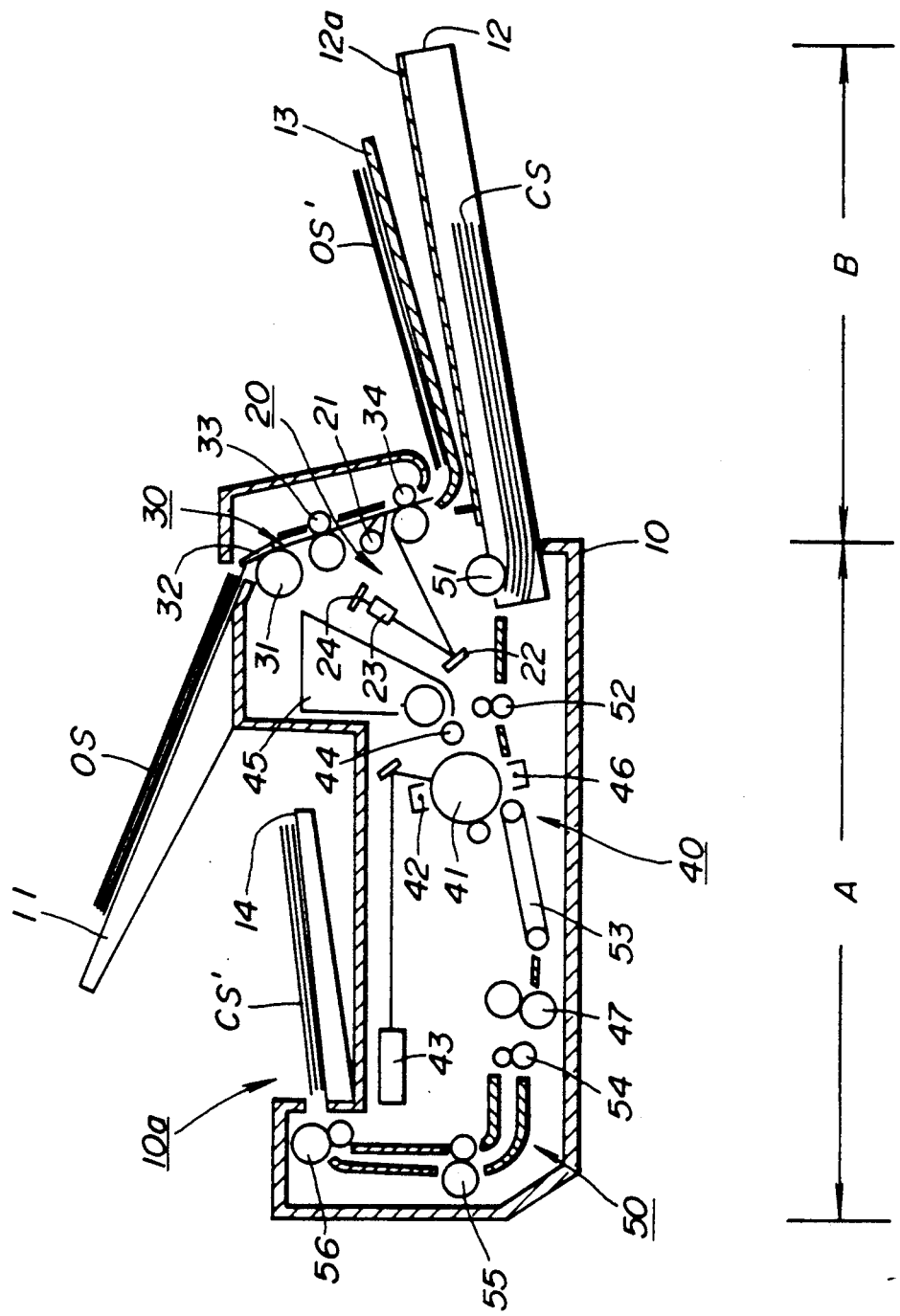
FIG. 3 is a cross-sectional view showing a facsimile machine and a method of feeding sheets in accordance with a second embodiment of the present invention.

Referring to FIG. 3, there is shown a structure of a facsimile machine in accordance with a second embodiment of the present invention, in which, since the fact is taken into consideration that the recording paper cassette 12 must be dismounted from the machine casing 10 as required, a stacker for receiving and stacking the already-read original sheets OS', i.e., a read-original sheet stacker 13 is separately provided at the same side of the casing 10 as the recording paper cassette 12, so that the installation space of this facsimile machine can be reduced as in the first embodiment.

In FIG. 3, a stacker for receiving and stackingthe already-recorded cut sheets CS', i.e., a recorded paper stacker 14 is also illustrated as provided in the recessed zone 10a on the upper surface of the casing 10, but this stacker part may be arranged to be the same as the corresponding part (refer to FIG. 2) in the first embodiment and it is practically suffice.

In FIG. 3, further, the same elements as those in FIG. 2 are denoted by the same reference numerals and explanation thereof is omitted.

Figure 4:
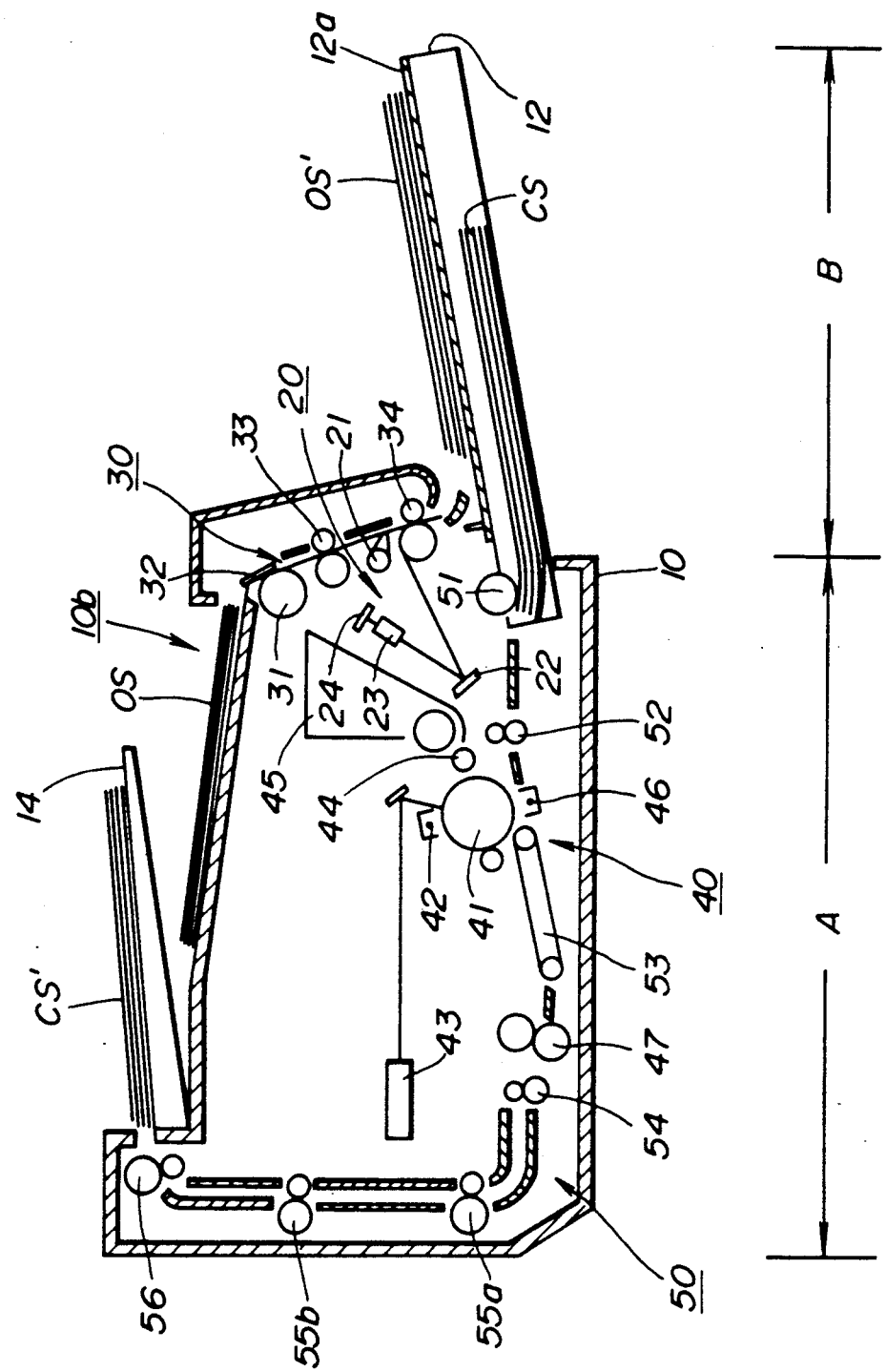
FIG. 4 is a cross-sectional view showing a facsimile machine and a method of feeding sheets in accordance with a third embodiment of the present invention.

Shown in FIG. 4 is a structure of a facsimile machine in accordance with a third embodiment of the present invention, in which a zone 10b for placement of the original sheets OS are provided on the upper side of the machine casing 10 while the recording paper stacker 14 is mounted to the casing in a zone spatially overlapped with this zone 10b, so that the installation space of this facsimile machine can also be reduced as in the foregoing embodiments.

Even in FIG. 4, the same elements as those in FIG. 2 or FIG. 3 are denoted by the same reference numerals or symbols and explanation thereof is omitted.

Figure 5:
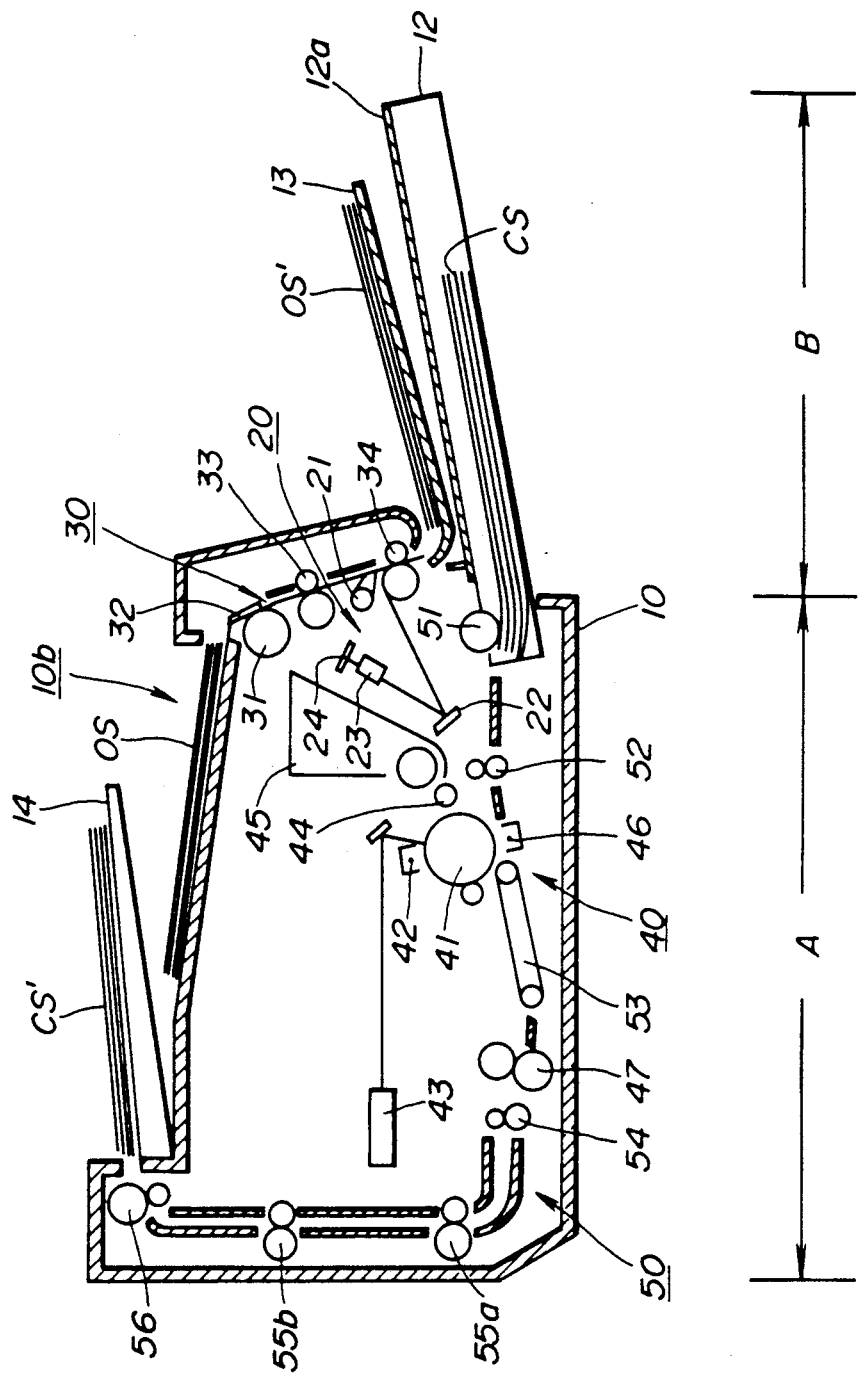
FIG. 5 is a cross-sectional view showing a facsimile machine and a method of feeding sheets in accordance with a fourth embodiment of the present invention.

FIG. 5 shows a structure of a facsimile machine in accordance with a fourth embodiment of the present invention, which corresponds to a combination of the second embodiment (refer to FIG. 3) and the third embodiment (refer to FIG. 4), that is, the installation zone B of the recording paper cassette 12 is the same as that in the second embodiment and the installation zone A of the machine casing 10 is the same as that in FIG. 3. Of course, the whole installation space of the facsimile machine of the fourth embodiment can be reduced as in the foregoing embodiments.

Even in FIG. 5, the same elements as those in FIG. 2 to FIG. 4 are denoted by the same reference numerals or symbols and explanation thereof is omitted.

Although a so-called reflecting and condensing type of reading means using a CCD sensor has been illustrated as the reading means 20 and a so-called electrophotographic type recording means using a photosensitive drum has been illustrated as the recording means 40, as an example in the foregoing embodiments, it goes without saying that the present invention is not limited to these types of reading and recording means. For example, such a type of reading means as using a contact type sensor may be employed as the reading means 20 and a thermal transfer type of recording means may be employed as the recording means 40 as necessary.

What is claimed is:

1. A sheet feeding method in a facsimile machine using cut sheets as received-signal recording paper and including a machine casing as a main frame of said facsimile machine and a recording paper cassette removably attached onto one side of said machine casing for containing the cut sheets, said method comprising the steps of:
sequentially introducing original document sheets from a casing installation zone where the machine casing is installed into interior of the casing;
reading a picture image written on one of the original sheets to be transmitted within the casing; and
discharging the original sheet having the image already read therefrom into a recording-cassette installation zone where said recording paper cassette is installed.

2. A sheet feeding method in a facsimile machine as set forth in claim 1, further comprising the steps of sequentially introducing said cut sheets from said recording papter cassette into the interior of said machine casing, recording a received picture image on one of the cut sheets within the casing, and discharging the cut sheet having the image recorded thereon into said casing installation zone.

3. A sheet feeding method in a facsimile machine as set forth in claim 2, wherein discharging of said original document sheet having the image read therefrom is carried out on an upper cover of said recording paper cassette, discharging of said cut sheet having the received picture image recorded thereon is carried out on said machine casing, and said original document sheets are sequentially introduced into the interior of the machine casing from an original document base provided at a level different from a cut-sheet discharge zone into which the cut sheet having the received image recorded thereon is discharged.

4. A sheet feeding method in a facsimile machine as set forth in claim 2, wherein discharging of said original document sheet having the image read therefrom is carried out into a stacker provided above said recording paper cassette, discharging of said cut sheet having the received picture image recorded thereon is carried out on said machine casing, and said original document sheets are sequentially introduced into the interior of the machine casing from an original document base provided at a level different from a cut-sheet discharge zone into which the cut sheet having the received image recorded thereon is discharged.

5. A sheet feeding method in a facsimile machine as set forth in claim 2, wherein discharging of said original document sheet having the image read therefrom is carried out on an upper cover of said recording paper cassette, discharging of said cut sheet having the received picture image recorded thereon is carried out into a stacker provided above said machine casing, and said original document sheets are sequentially introduced into the interior of the machine casing from an original placement zone provided at a level different from said stacker.

6. A sheet feeding method in a facsimile machine as set forth in claim 2, wherein discharging of said original document sheet having the image read therefrom is carried out into a first stacker provided above said recording paper cassette, discharging of said cut sheet having the received picture image recorded thereon is carried out into a second stacker provided above said machine casing, and said original document sheets are sequentially introduced into the interior of the machine casing from an original document placement zone provided at a level different from said second stacker.

7. A facsimile machine using cut sheets as received-signal recording paper comprising:
a machine casing as a main frame of said facsimile machine, housing at least an original reading part and a received-image recording part, said machine casing being provided thereon partly with an image-recorded-sheet stocking zone for stacking therein some of said cut sheets having received images recorded thereron;
a recording paper cassette containing the cut sheets as the received-image recording paper to be removably attached onto one side of said machine casing;
an original placement base provided as fixed to another part of the upper side of the casing different from said image-recorded-sheet stocking zone at a level different therefrom;
first sheet feeding means for feeding to said original reading part the original sheet introduced from said original placement base into interior of the machine casing and then feeding the original sheet already read by the original reading part onto said recording paper cassette; and
second sheet feeding means for feeding into said received-image recording part the cut sheet introduced from the recording paper cassette into the interior of the casing and then feeding the cut sheet having the image already recorded thereon by the received-image recording means into said image-recorded-sheet stocking zone.

8. A facsimile machine using cut sheets as received-signal recording paper comprising:
a machine casing as a main frame of said facsimile machine, housing at least an original reading part and a received-image recording part, said machine casing being provided thereon partly with an image-recorded-sheet stocking zone for stacking therein some of said cut sheets having received images recorded thereon;
a recording paper cassette containing the cut sheets as the received-image recording paper to be removably attached onto one side of said machine casing;
an original placement base provided as fixed to another part of the upper side of the casing different from said image-recorded-sheet stocking zone at a level different therefrom;
an original stacker provided at one side of said machine casing having said recording paper cassette;
first sheet feeding means for feeding to said original reading part the original sheet introduced from said original placement base into interior of the machine casing and then feeding the original sheet already read by the original reading part into said original stacker; and
second sheet feeding means for feeding into said received-image recording part the cut sheet introduced from the recording paper cassette into the interior of the casing and then feeding the cut sheet having the image already recorded thereon by the received-image recording means into said image-recorded-sheet stocking zone.

9. A facsimile machine using cut sheets as received-signal recording paper comprising:
   a machine casing as a main frame of said facsimile machine, housing at least an original reading part and a received-image recording part, said machine casing being provided thereon partly with an original placement zone for placing therein an original document sheet;
   a recording paper cassette containing the cut sheets as the received-image recording paper to be removably attached onto one side of said machine casing;
   a cut sheet stacker provided as fixed to another part of the upper side of the casing different from said original placement zone at a level different therefrom;
   first sheet feeding means for feeding to said original reading part the original sheet introduced from said original placement base into interior of the machine casing and then feeding the original sheet already read by the original reading part onto said recording paper cassette; and
   second sheet feeding means for feeding into said received-image recording part the cut sheet introduced from the recording paper cassette into the interior of the casing and then feeding the cut sheet having the image already recorded thereon by the received-image recording means into said cut sheet stacker.

10. A facsimile machine using cut sheets as received-signal recording paper comprising:
   a machine casing as a main frame of said facsimile machine, housing at least an original reading part and a received-image recording part, said machine casing being provided theroen partly with an original placement zone for placing therein an original document sheet;
   a recording paper cassette containing the cut sheets as the received-image recording paper to be removably attached onto one side of said machine casing;
   a cut sheet stacker provided as fixed to another part of the upper side of the casing different from said original placement zone at a level different therefrom;
   an original stacker provided at one side of said machine casing having said recording paper cassette;
   first sheet feeding means for feeding to said original reading part the original sheet introduced from said original placement base into interior of the machine casing and then feeding the original sheet already read by the original reading part onto said original stacker; and
   second sheet feeding means for feeding into said received-image recording part the cut sheet introduced from the recording paper cassette into the interior of the casing and then feeding the cut sheet having the image already recorded thereon by the received-image recording means into said cut sheet stacker.

* * * * *